United States Patent
Steeby

(10) Patent No.: US 6,406,403 B1
(45) Date of Patent: Jun. 18, 2002

(54) TORQUE RAMP DOWN CONTROL

(75) Inventor: Jon A. Steeby, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/742,244

(22) Filed: Dec. 21, 2000

(51) Int. Cl.$^7$ ............................................. B60K 41/04
(52) U.S. Cl. ..................................................... 477/109
(58) Field of Search ........................................ 477/109

(56) References Cited

U.S. PATENT DOCUMENTS

| | | | |
|---|---|---|---|
| 4,593,580 A | 6/1986 | Schulze | 74/866 |
| 4,850,236 A | 7/1989 | Braun | 74/337 |
| 5,582,558 A | 12/1996 | Palmeri | 477/109 |
| 5,735,771 A | 4/1998 | Genise | 477/111 |
| 5,743,143 A | 4/1998 | Carpenter et al. | 74/335 |
| 5,830,104 A | * 11/1998 | Desautels et al. | 477/109 |
| 5,911,787 A | 6/1999 | Walker | 74/335 |
| 5,950,491 A | 9/1999 | Wadas | 74/335 |
| 6,015,366 A | 1/2000 | Markyvech et al. | 477/109 |
| 6,126,570 A | 10/2000 | Bohm et al. | 477/109 |
| 6,352,492 B1 | * 3/2002 | Steeby et al. | 477/109 |

* cited by examiner

Primary Examiner—Dirk Wright
(74) Attorney, Agent, or Firm—Howard D. Gordan

(57) ABSTRACT

A method/system for adaptively controlling engine fueling to control the rate of decreasing engine torque $((-d/dt)(ET))$ during disengagement of a jaw clutch (70) while maintaining the vehicle master friction clutch (20) engaged. Engine torque is decreased at a determined by comparing the rate of change of throttle pedal position $((d/dt)(THL))$ to allow minimum (MIN) and maximum (MAX) rates of engine torque decrease.

10 Claims, 4 Drawing Sheets

TORQUE RAMP DOWN CONTROL

RELATED APPLICATIONS

This application is related to U.S. Ser. No. 09/704,288, filed Nov. 1, 2000, titled ADAPTIVE ENGINE CONTROL FOR SHIFTING TO NEUTRAL, and assigned to Eaton Corporation, assignee of this application.

BACKGROUND OF THE INVENTION

1. Field of the Invention

The present invention relates to a control method/system for ramping down engine torque to a value calculated to provide a substantially zero driveline torque at a rate determined by comparing sensed rate of change of throttle pedal position (drive torque demand) to a predetermined maximum rate of decrease and a predetermined minimum rate of decrease.

2. Description of the Prior Art

Fully or partially automated mechanical transmission systems that, upon determining that a shift from a currently engaged ratio into neutral and then into a target ratio is desirable, will, preferably but not necessarily while maintaining the vehicle master friction clutch engaged, initiate automatic fuel control to cause reduced torque across the jaw clutches to be disengaged, are known in the prior art as may be seen by reference to U.S. Pat. Nos. 4,850,236; 5,582,558; 5,735,771; 5,775,639; 6,015,366; and 6,126,570, the disclosures of which are incorporated herein by reference.

These systems include systems that attempt to fuel the engine to achieve a sustained zero driveline torque, see U.S. Pat. No. 4,593,580, the disclosure of which is incorporated herein by reference, and systems that fuel the engine to force one or more torque reversals, see U.S. Pat. No. 4,850,236.

Systems utilizing the engine fueling technique of forced torque reversals, especially repeated forced torque reversals, provide a highly reliable routine for allowing a shift to neutral, but may provide a somewhat less than desirable shift feel. Systems utilizing the engine fueling technique of aiming and attempting to remain at zero driveline torque provide a relatively high quality shift fuel, but did not provide desirable reliability of allowing an engaged jaw clutch to be acceptably disengaged.

In accordance with the above-mentioned copending U.S. Ser. No. 09/704,288, an adaptive engine fueling control is provided which, based upon a sensed movement, preferably a rate of movement of a shift member, such as a shift lever in the Y—Y direction or the like, will utilize engine fueling to achieve the most appropriate (a) of aiming at a zero driveline torque, (b) or causing torque bumps to force torque reversals across the jaw clutch to be disengaged, or (c) a combination of thereof. This is accomplished by, upon determining that a shift into transmission neutral is required, causing the engine to be fueled to cause an output (flywheel) torque determined to cause a substantially zero driveline torque while monitoring shift member position. After a period of time, if the rate of change of the shift member position is greater than a reference value, than the desired substantially zero torque condition has been achieved (as expressed by the operator's ability to move the shift lever toward the Y—Y neutral position) and a torque bump routine to forced torque reversals is not required. If however, the shift member rate of movement is not at least equal to the reference value, than the torque bump routine may be necessary and will be initiated.

Automated transmission systems attempt to gently ramp down engine torque (i.e., fueling) to provide a smooth disengagement which is perceived as a "high quality shift". A problem with this technique is that the time required to perform the step of ramping down fuel/torque may result in a shift that takes too long to complete.

If the shift takes too long to complete, the vehicle will slow down more than desired. Also, engine speed at shift completion will be lower than at shift initiation (see U.S. Pat. Nos. 5,272,939; 5,335,566; and 4,937,749, the disclosures of which are incorporated herein by reference).

If fuel is ramped down very rapidly, the shift quality will suffer.

SUMMARY OF INVENTION

In accordance with the present invention, a method/system for controlling engine torque ramp down rate is provided which will vary the rate depending on driver demand and minimum and maximum allowable rates. A maximum rate of engine torque decrease (MAX) is selected which will provide the quickest shift to neutral at acceptable shift quality. A minimum rate of engine torque decrease (MIN) is selected which will provide a high shift quality but slowest acceptable shift. The drivers rate of change of throttle pedal position (rate of change of torque demand), d/dt (THL), is compared to the minimum (MIN) and maximum (MAX) reference rates. If the rate of change of throttle position exceeds the maximum reference value ((d/dt(THL)) >MAX), then the engine will be commanded to decrease torque at said maximum reference rate (MAX). If the rate of change of throttle position is less than the minimum reference value ((d/dt(THL))<MIN), then the engine will be commanded to decrease torque at said minimum reference rate (MIN). If the rate of change of throttle position is less than the maximum reference value and exceeds the minimum reference value, ((MAX)>(d/dt)(THL))>(MIN)), then the engine will be commanded to decrease torque at a rate generally equal to said rate of change of throttle position (d/dt)(THL)).

Accordingly, it is an object of the present invention to provide an improved method/system for adaptively controlling engine fueling control the rate at which engine torque is ramped down to a value corresponding to zero driveline torque. The rate is determined by the rate of change of throttle pedal position and is subject to upper (MAX) and lower (MIN) limits.

This and other objects and advantages of the present invention will become apparent from a reading of the following description of the preferred embodiment taken in connection with the attached drawings.

DESCRIPTION OF THE PREFERRED EMBODIMENT

Figure 1:
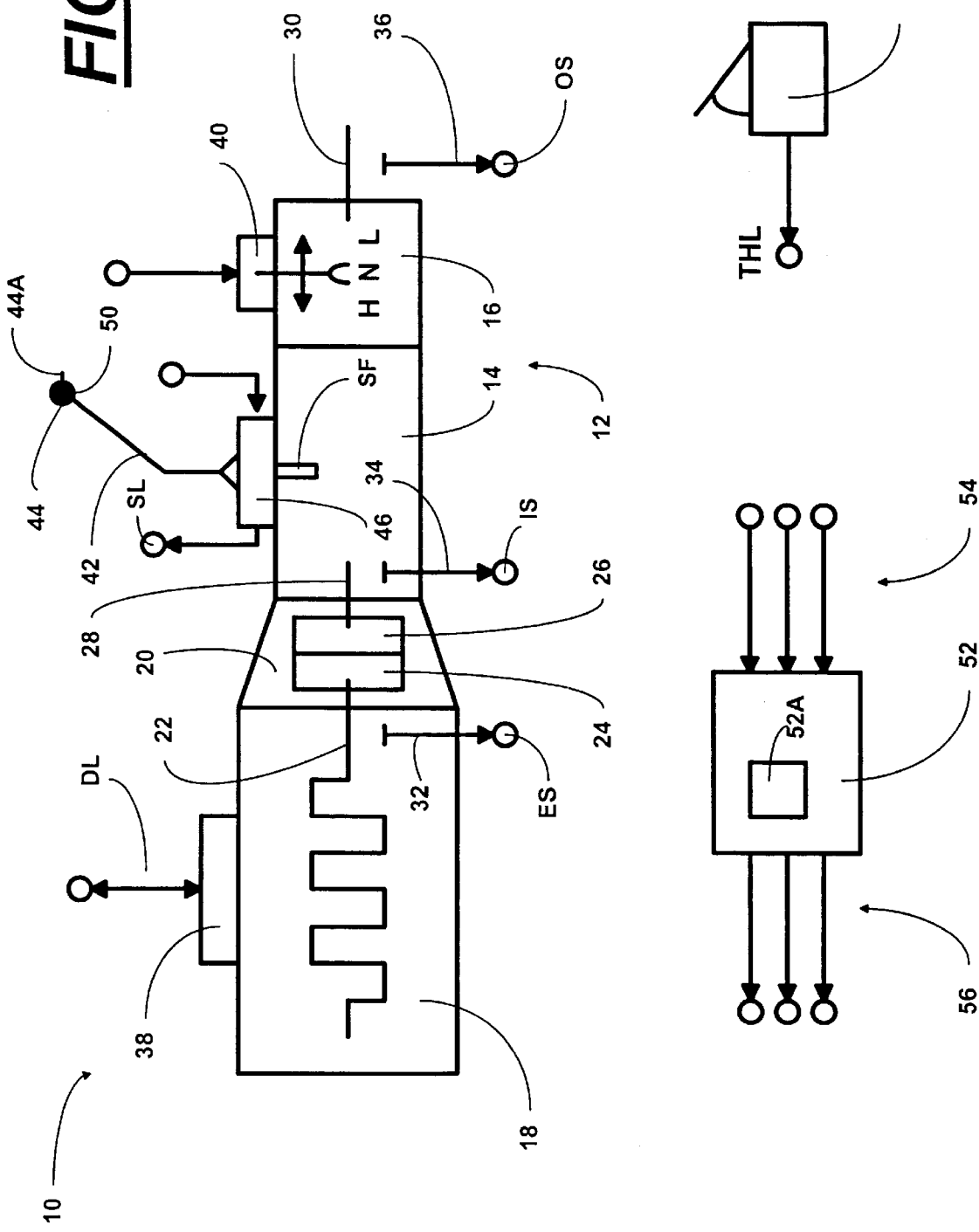
FIG. 1 is a schematic illustration of a vehicular drivetrain using the adaptive engine fueling control method/system of the present invention.

An at least partially automated vehicular drivetrain system 10 using the adaptive engine fueling control technique of the present invention is schematically illustrated in FIG. 1. System 10 may be fully automated, as seen by way of example in U.S. Pat. No. 4,361,060, partially automated, as seen by way of example in U.S. Pat. Nos. 4,648,290, and 5,409,432, or manual with controller assist, as seen by way of example in U.S. Pat. Nos. 4,850,236; 5,582,558; 5,735,771; and 6,015,366.

In system 10, a change-gear transmission 12 comprising a manually or automatically shifted main transmission section 14 connected in series with a splitter-type auxiliary transmission section 16 is drivingly connected to an internal combustion engine 18, such as a well-known gasoline or diesel engine, by a manually or automatically operated master friction clutch 20 or other non-positive coupling. Preferably, auxiliary transmission section 16 is of the three-layer, four-speed combined splitter/range type, as illustrated in U.S. Pat. Nos. 4,754,665 and 5,390,561, the disclosures of which are incorporated herein by reference.

Engine 18 includes a crankshaft 22, which is attached to a driving member 24 of master clutch 20, which is normally frictionally engaged with a driven member 26, which is attached to the input shaft 28 of the transmission. A transmission output shaft 30 extends from the auxiliary transmission section 16 for driving connection to the vehicular drive wheels, as through a drive axle or the like. Transmissions 12, by way of example, may be of the type well known in the prior art and are sold by the assignee of this application, EATON CORPORATION, under the trademark "Super-10" and may be seen in greater detail by reference to U.S. Pat. Nos. 6,015,366; 5,974,906; and 5,974,354, the disclosures of which are incorporated herein by reference.

Controller-assisted transmission system 10 further includes rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of throttle pedal position. The signal is usually a percentage (0% to 100%) of fuel throttle position. Engine 18 may be electronically controlled, including an electronic controller 38 communicating over an electronic data link (DL) operating under an industry standard protocol such as SAE J-1922, SAE J-1939, ISO 11898 or the like. A manual clutch pedal (not shown) or an automated actuator (not shown) may be utilized to selectively engage and disengage normally engaged master clutch 20, as is well known in the prior art.

An auxiliary section actuator 40 is provided to control shifting of the auxiliary section splitter and/or range ratios. Preferably, at least the splitter actuator will be a three-position actuator, allowing the splitter section to be shifted to and maintained in a high splitter ratio, a low splitter ratio or a splitter-neutral position, the structure and advantages of which may be appreciated in greater detail by reference to U.S. Pat. Nos. 5,651,292; 5,974,906; and 5,970,810, the disclosures of which are incorporated herein by reference.

Transmission system 10 as illustrated includes a manually operated shift lever 42 having a shift knob 44 thereon. Shift knob 44 may be of the type described in aforementioned U.S. Pat. No. 5,957,001. As is well known, shift lever 42 is manually manipulated in a known shift pattern for selective engagement and disengagement of various shift ratios. Alternatively, an X-Y shift actuator, which by way of example may be of the types illustrated in U.S. Pat. Nos. 5,481,170; 5,281,902; 4,899,609; and 4,821,590, may be provided for automated or shift-by-wire shifting the transmission main section. Shift Knob 44 may include an intent to shift switch 44A by which the vehicle operator will request automatic engine fueling control to relieve torque lock and allow a shift to transmission neutral.

System 10 includes a control unit, preferably a microprocessor-based control unit of the type illustrated in U.S. Pat. Nos. 4,595,986; 4,361,065; and 5,335,566, the disclosures of which are incorporated herein by reference, for receiving input signals 54 and processing same according to predetermined logic rules to issue command output signals 56 to system actuators, such as engine controller 38, auxiliary section shift actuator 40, and the like.

Figure 1A:
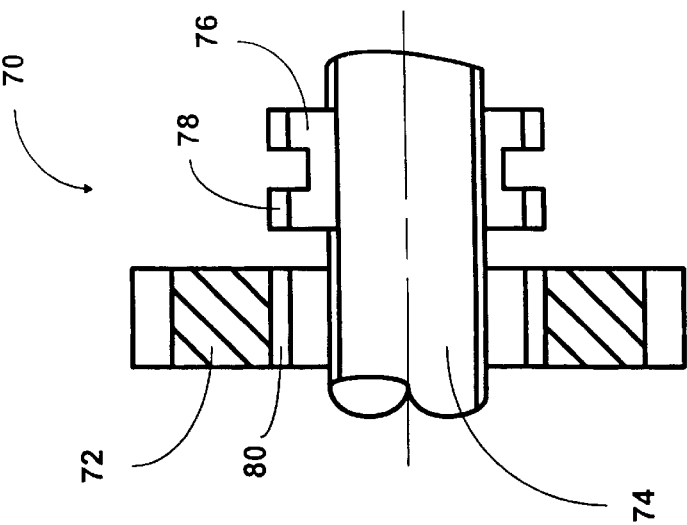
FIG. 1A is a schematic illustration of a typical jaw clutch assembly utilized with a mechanical transmission.

FIG. 1A illustrates a typical jaw clutch assembly 70 for selectively engaging and disengaging a gear 72 to a shaft 74, such as a transmission main shaft, for engaging and disengaging a transmission ratio. Briefly, clutch member 76 is splined to shaft 74 for axial movement relative thereto and rotation therewith. Clutch member 76 carries external clutch teeth 78 for engaging internal clutch teeth 80 formed in the inner diameter bore of gear 72. The clutch member 76 is axially positioned by a shift fork (not shown) or the like. The shift fork is typically axially positioned by a shift rail, a shift shaft, a ball ramp or ball screw, a piston, or functionally similar device.

As is known, to disengage a jaw clutch in a vehicular mechanical transmission, especially in a heavy-duty vehicle, it is necessary to relieve torque lock at the engaged jaw clutch. If opening the master clutch 20 is not achievable or desirable, torque lock can be relieved by fueling the engine to cause assumed zero driveline torque and/or by forcing torque reversals which will positively cause crossings of zero driveline torque. While controlling engine fueling to aim and remain at a zero driveline torque value will result in a higher quality shift, this method may not result in actually allowing engaged jaw clutches underload to be disengaged. Using a "torque bump" or other routine to forced torque reversals across the jaw clutch to be disengaged is highly reliable, but may result in a relatively lower quality shift.

Control of engine torque to achieve a desired output or flywheel torque is known as and may be seen by reference U.S. Pat No. 5,620,392, the disclosure of which is incorporated herein by reference.

Engine torque as used herein refers to a value indicative of an engine torque, usually gross engine torque, from which an output or flywheel torque may be calculated or estimated. The relationship of gross engine torque to flywheel torque is discussed in U.S. Pat. Nos. 5,509,867 and 5,490,063, the disclosures of which are incorporated herein by reference.

One or more engine torques or torque limit value may be commanded on, or read from, an industry standard data link, DL, such as an SAE J-1922, SAE J-1939 or ISO11898 compliant data link.

According to the present invention, upon sensing that a shift from an engaged ratio to neutral, without disengaging the master clutch 20, is required, the engine is first commanded to ramp to a value of engine torque determined or calculated, based upon sensed system operating parameters, to correspond to zero driveline torque.

Figure 2:
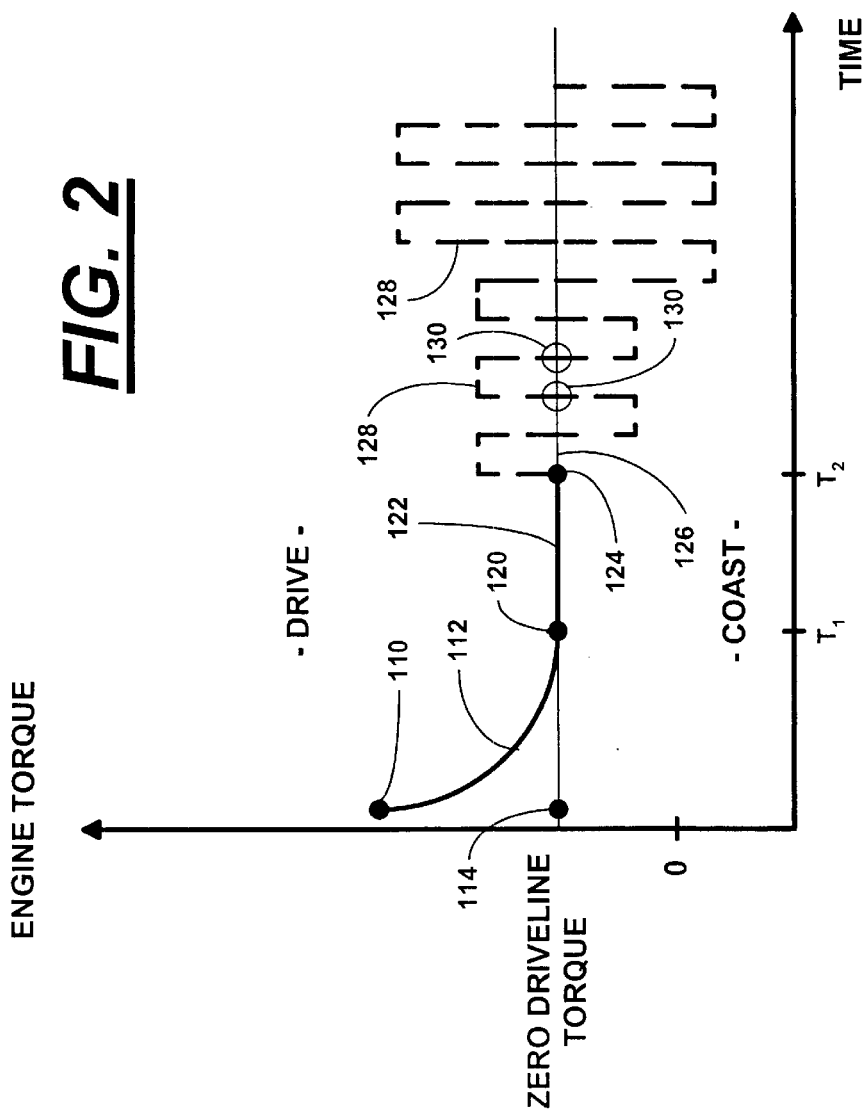
FIG. 2 is a graphical representation of the engine fuel control of the present invention to allow disengagement of an engaged ratio.

Referring to FIG. 2, if the shift initiates at a drive condition 110, the engine torque will be commanded to ramp down 112 to the calculated value 114 assumed to correspond to the zero driveline torque condition. Similarly, if the shift to neutral initiates at a coast condition, the engine torque will be commanded to ramp up to the calculated value 114. The slope of the ramp 112 (i.e., the rate of change of engine torque) will, within upper (MAX) and lower (MIN) limits, be a function of current rate of change of throttle position THL. Upon achieving the assumed zero driveline torque condition 120 (at time T,) the engine will be commanded to remain at this condition 122 for a period of T time ($T_2-T_1$). The period of time ($T_2-T_1$) is typically about 150–300 milliseconds. At expiration of that period of time 124, the sensed velocity of a shift member, such as for example, a shift lever 42 or shift finger SF, is compared to a reference value REF. If the shift member velocity equals or exceeds the reference value (($d/dt(SL_{Y\_Y})$)>REF), this indicates that the shift member is moving at a rate towards jaw clutch disengagement indicative of non-torque lock conditions and a torque bump routine is not necessary or desirable. In such conditions, the engine will be commanded to continue generating an output torque assumed to correspond to zero driveline torque (solid line 126) until transmission neutral is sensed.

If the sensed shift member velocity does not equal or exceed the reference value (($d/dt(SL_{Y\_Y})$)<REF), then torque lock conditions may exist and a torque bump fueling routine of the engine (dashed lines 128) to forced torque reversals (130) at the jaw clutch will commence until neutral is sensed and/or a time period expires. The magnitude and/or shape of the torque bumps 128 may vary with time.

Automated transmissions attempt to gently and gradually ramp down engine torque (i.e., fueling) to provide a smooth disengagement which is perceived as a "high quality shift". A problem with this technique is that the time required to perform the step of ramping down fuel/torque may result in a shift that takes too long to complete. If the shift takes too long to complete, the vehicle will slow down more than desired. Also, engine speed at shift completion will be lower than at shift initiation. If torque is ramped down excessively quickly, then shift quality may be lower than desired.

In accordance with the present invention, a method/system for controlling engine torque ramp down rate is provided which will vary the rate depending on driver demand and minimum and maximum allowable rates. A maximum rate of engine torque decrease (MAX) is selected which will provide the quickest shift to neutral at acceptable shift quality. A minimum rate of engine torque decrease (MIN) is selected which will provide a high shift quality but slowest acceptable shift. The drivers rate of change of throttle pedal position (rate of change of torque demand), d/dt (THL), is compared to the minimum (MIN) and maximum (MAX) reference rates. If the rate of change of throttle position exceeds the maximum reference value (($d/dt(THL)$) >MAX), then the engine will be commanded to decrease torque at said maximum reference rate (MAX). If the rate of change of throttle position is less than the minimum reference value (($d/dt(THL)$)<MIN), then the engine will be commanded to decrease torque at said minimum reference rate (MIN). IF the rate of change of throttle position is less than the maximum reference value and exceeds the minimum reference value, ((MAX)>($d/dt$)(THL))>(MIN)), then the engine will be commanded to decrease torque at a rate equal to said rate of change of throttle position ($d/dt$)(THL)).

Figure 3:
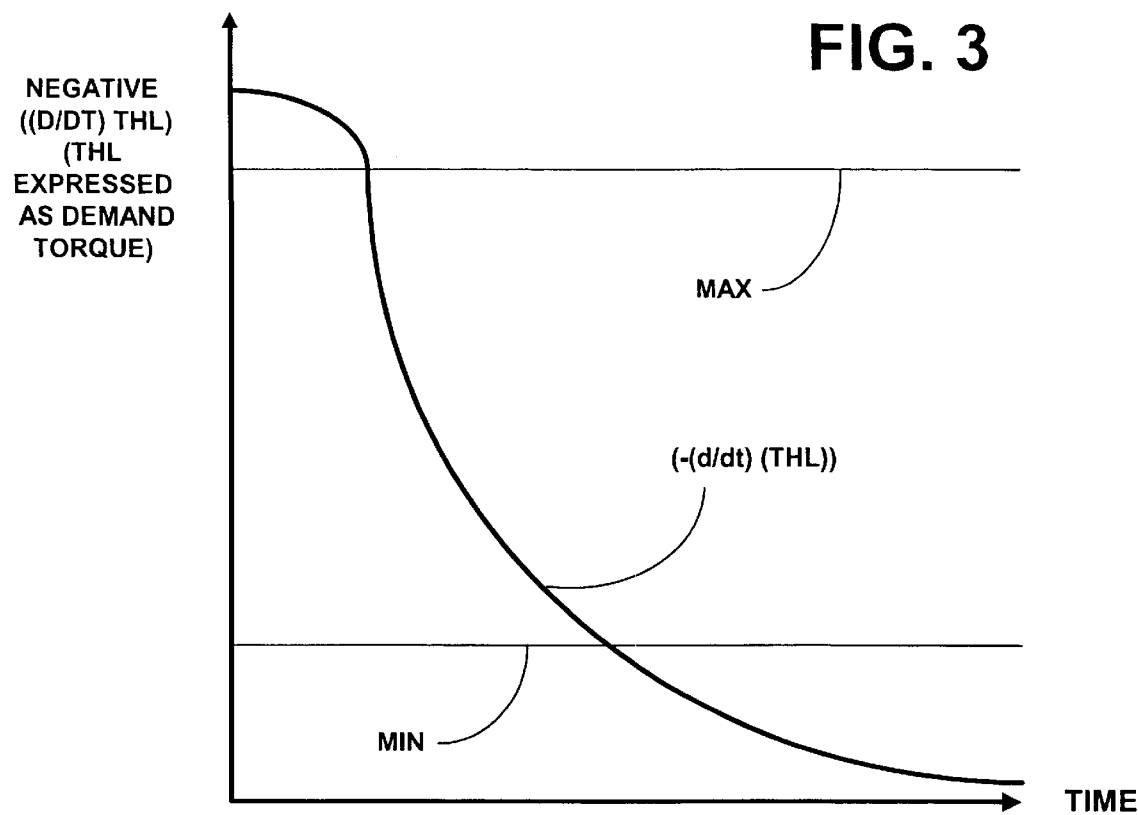
FIG. 3 is a graphical representation of engine torque decrease rate control according to the present invention.
Figure 3:
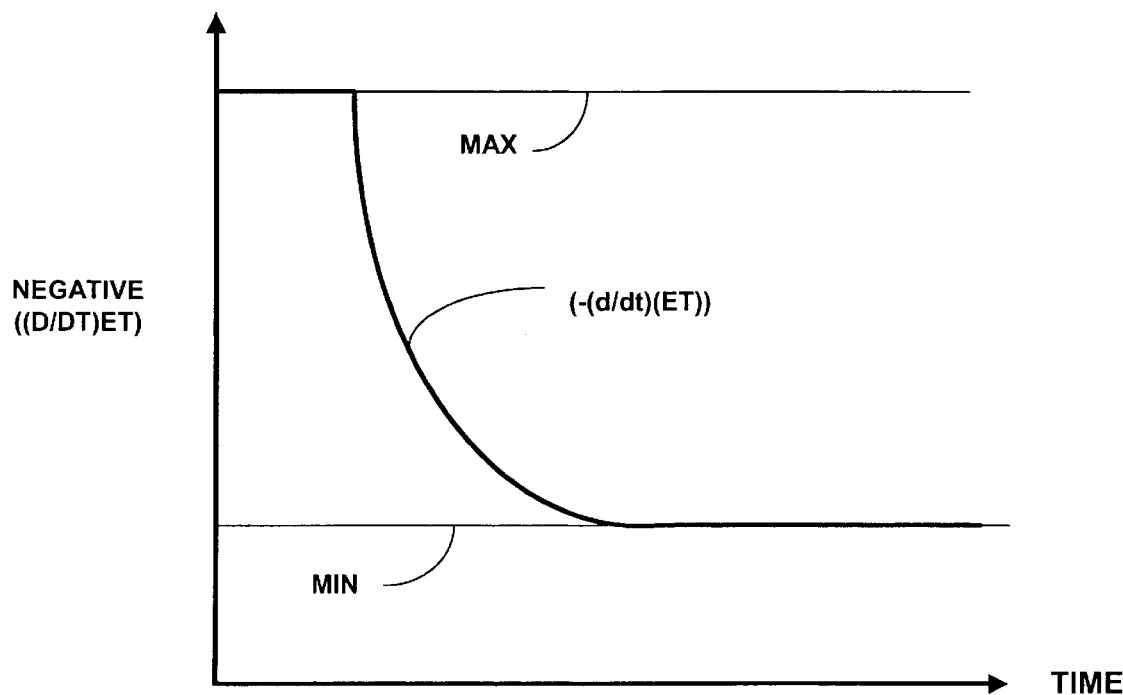

FIG. 3 is schematic illustration, in graphical format, of the control system/method of the present invention.

Figure 4:
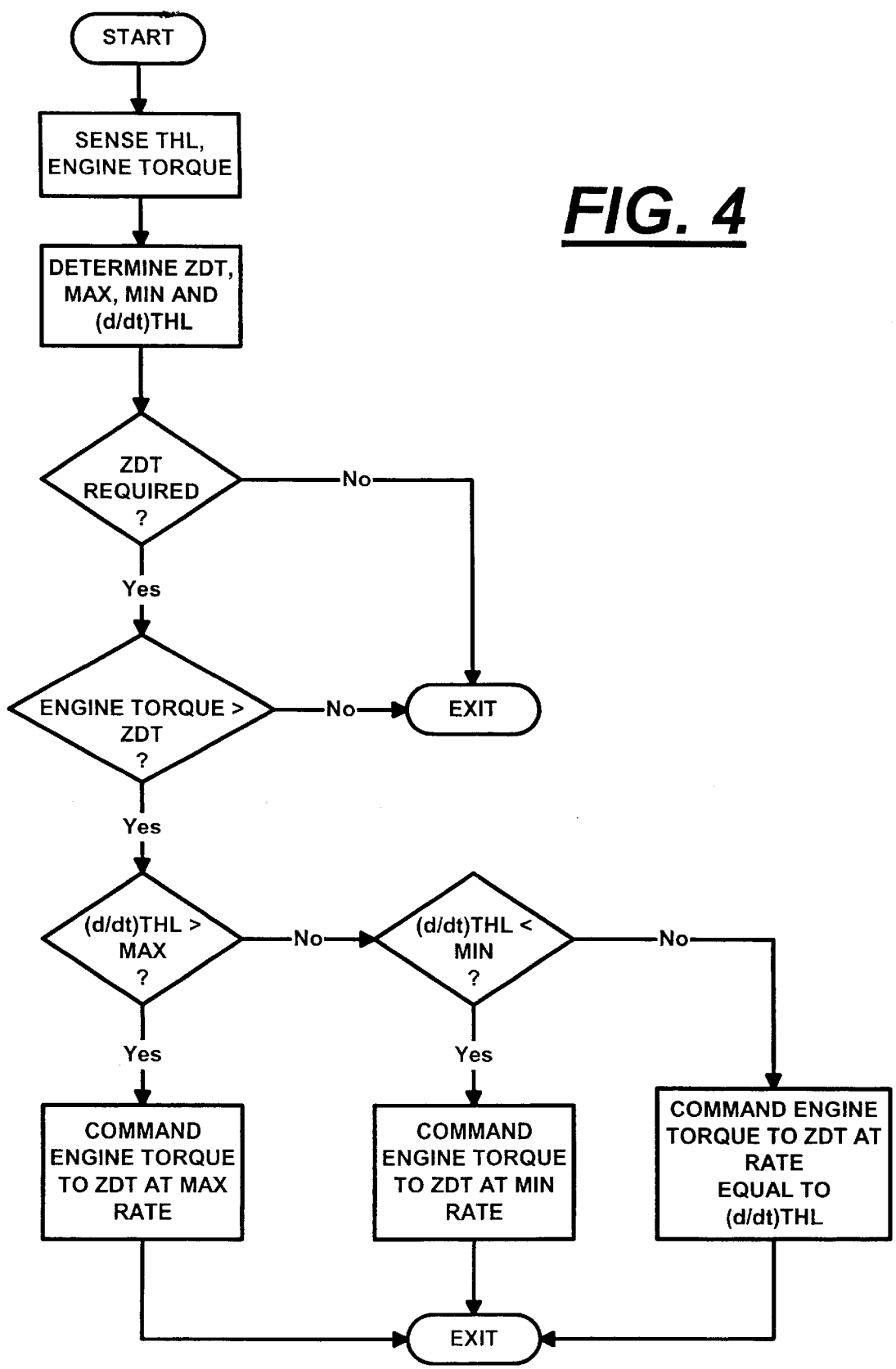
FIG. 4 is a schematic illustration, in flow chart format, of the adaptive engine fuel control method/system of the present invention.

FIG. 4 is a schematic illustration, in flow chart format, of the adaptive engine fueling control subroutine of the present invention. Preferably, the subroutine will be performed during each control loop.

In the preferred embodiments of the present invention, if engaged in a higher ratio (such as in 8th, 9th, or 10th speed in a 10-speed transmission) the maximum ramp rate (i.e., MAX rate of change of engine torque) will be greater than if in a lower ratio (1st, 2nd, or 3rd in a 10-speed transmission).

Accordingly, it may be seen that a new and improved system/ method for adaptively controlling engine fueling while decreasing engine torque, such as while disengaging a jaw clutch with the master friction clutch engaged, is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches, an engine fuel controller (38) for controlling fueling of the engine, said fuel controller having at least one mode of operation for controlling engine torque in response to a torque control command signal, and a system controller (52) for receiving input signals (54) including at least one of signals indicative of engine speed (ES), engine torque (ET) input shaft speed (IS), an operator throttle setting (THL), master friction clutch engagement, shift member position ($SL_{Y\_Y}$, $SF_{Y\_Y}$) and an engaged gear ratio (IS/OS), and to process said input signals in accordance with logic rules to issue command output signals (56) to system actuators including said fuel controller, said method comprising the steps of, upon determining a requirement to decrease driveline torque to disengage an engaged jaw clutch, commanding said engine to be fueled so that engine torque is decreased to equal a target engine torque;

determining a current rate of decrease of throttle setting (−($d/dt$)(THL));

if said current rate of decrease of throttle setting exceeds an allowable maximum rate of decrease of engine torque (MAX), commanding engine torque to decrease at said maximum rate, and if said current rate of decrease of throttle setting is less than an allowable minimum rate of decrease of engine torque (MIN), commanding engine torque to decrease at said minimum rate.

2. The method of claim 1 comprising the additional step:

if said current rate of decrease of throttle setting is less than said maximum rate and greater than said minimum rate (MAX>((−$d/dt$)(THL))>MIN), commanding engine torque to decrease at a rate equal to said current rate of decrease of throttle setting.

3. The method of claim 1 further comprising:

determining a target engine torque (ZDT) corresponding to a substantially zero torque across the engaged jaw clutch.

4. The method of claim 2 further comprising:

determining a target engine torque (ZDT) corresponding to a substantially zero torque across the engaged jaw clutch.

5. The method of claim 1 wherein said maximum allowable rate of decrease is greater at upper transmission ratios ($8^{th}$, $9^{th}$, $10^{th}$) than at lower transmission ratios ($1^{st}$, $2^{nd}$, $3^{rd}$).

6. The method of claim 2 wherein said maximum allowable rate of decrease is greater at upper transmission ratios ($8^{th}$, $9^{th}$, $10^{th}$) than at lower transmission ratios ($1^{st}$, $2^{nd}$, $3^{rd}$).

7. A control system for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches, an engine fuel controller (38) for controlling fueling of the engine, said fuel controller having at least one mode of operation for controlling engine torque in response to a torque control command signal, and a system controller (52) for receiving input signals (54) including at least one of signals indicative of engine speed (ES), engine torque (ET) input shaft speed (IS), an operator throttle setting (THL), master friction clutch engagement, shift member position ($SL_{Y\_Y}$, $SF_{Y\_Y}$) and an engaged gear ratio (IS/OS), and to process said input signals in accordance with logic rules to issue command output signals (56) to system actuators including said fuel controller, said control system characterized by said logic rules including rules, upon determining a requirement to decrease driveline torque to disengage an engaged jaw clutch, for commanding a engine to be fueled so that engine torque is decreased to equal a target engine torque;

determining a current rate of decrease of throttle setting ($-(d/dt)(THL)$);

if said current rate of decrease of throttle setting exceeds an allowable maximum rate of decrease of engine torque (MAX), commanding engine torque to decrease at said maximum rate, and if said current rate of decrease of throttle setting is less than an allowable minimum rate of decrease of engine torque (MIN), commanding engine torque to decrease at said minimum rate.

8. The control system of claim 7 which said logic rules include rates for:

if said current rate of decrease of throttle setting is less than said maximum rate and greater than said minimum rate ($MAX>((-d/dt)(THL))>MIN$), commanding engine torque to decrease at a rate equal to said current rate of decrease of throttle setting.

9. The control system of claim 1 wherein said logic rules include for:

determining a target engine torque (ZDT) corresponding to a substantially zero torque across the engaged jaw clutch.

10. The control of claim 7 wherein said maximum allowable rate of decrease is greater at upper transmission ratios ($8^{th}$, $9^{th}$, $10^{th}$) than at lower transmission ratios ($1^{st}$, $2^{nd}$, $3^{rd}$).

* * * * *